(12) United States Patent
Vogel

(10) Patent No.: US 12,379,897 B2
(45) Date of Patent: Aug. 5, 2025

(54) PROCESSING UNIT, METHOD AND COMPUTER PROGRAM FOR MULTIPLICATION

(71) Applicant: Robert Bosch GmbH, Stuttgart (DE)

(72) Inventor: Sebastian Vogel, Schaidt (DE)

(73) Assignee: ROBERT BOSCH GMBH, Stuttgart (DE)

(*) Notice: Subject to any disclaimer, the term of this patent is extended or adjusted under 35 U.S.C. 154(b) by 802 days.

(21) Appl. No.: 17/625,026

(22) PCT Filed: Jul. 14, 2020

(86) PCT No.: PCT/EP2020/069872
§ 371 (c)(1),
(2) Date: Jan. 5, 2022

(87) PCT Pub. No.: WO2021/023482
PCT Pub. Date: Feb. 11, 2021

(65) Prior Publication Data
US 2022/0291899 A1    Sep. 15, 2022

(30) Foreign Application Priority Data
Aug. 7, 2019  (DE) .................... 10 2019 211 829.1

(51) Int. Cl.
*G06F 7/483* (2006.01)
*G06F 7/487* (2006.01)

(52) U.S. Cl.
CPC .......... *G06F 7/4833* (2013.01); *G06F 7/4876* (2013.01)

(58) Field of Classification Search
CPC ........ G06F 7/53; G06F 7/5235; G06F 7/4876; G06F 7/523; G06F 7/483; G06F 7/4833; G06F 7/485
See application file for complete search history.

(56) References Cited

U.S. PATENT DOCUMENTS

| 3,396,535 A | 8/1968 | Milos |
| 4,864,529 A | 9/1989 | Shah et al. |
| 2014/0033203 A1* | 1/2014 | Dogon .................. G06F 9/3001 718/100 |

OTHER PUBLICATIONS

S. Vogel, J. Springer, A. Guntoro and G. Ascheid, "Self-Supervised Quantization of Pre-Trained Neural Networks for Multiplierless Acceleration," 2019 Design, Automation & Test in Europe Conference & Exhibition (Date), Florence, Italy, 2019, pp. 1094-1099, doi: 10.23919/DATE.2019.8714901. (Year: 2019).*

(Continued)

*Primary Examiner* — Andrew Caldwell
*Assistant Examiner* — Jonathan David Warner
(74) *Attorney, Agent, or Firm* — NORTON ROSE FULBRIGHT US LLP

(57) ABSTRACT

A processing unit for multiplying a first value by a first multiplicand, or for multiplying the first value by, in each instance, a second and third multiplicand. The processing unit receives the multiplicands in a logarithmic number format, so that the multiplicands are each present in the form of at least one exponent at a specifiable base. The processing unit includes a first register, in which either two exponents of the first multiplicand or the exponent of the second and the exponent of the third multiplicand are stored. A set configuration bit indicates whether either the two exponents of the first multiplicand or the exponent of the second and the exponent of the third multiplicand are stored in the first register. The processing unit includes at least two bitshift operators. A method and a computer program for multiplying the value by the multiplicand are also described.

9 Claims, 5 Drawing Sheets

(56) References Cited

OTHER PUBLICATIONS

S. Vogel, R. B. Raghunath, A. Guntoro, K. Van Laerhoven and G. Ascheid, "Bit-Shift-Based Accelerator for CNNs with Selectable Accuracy and Throughput," 2019 22nd Euromicro Conference on Digital System Design (DSD), Kallithea, Greece, 2019, pp. 663-667, doi: 10.1109/DSD.2019.00106. (Year: 2019).*
T. Gaddis, Starting Out with Python, 4th Edition, Pearson Education, Inc. 2009. (Year: 2009).*
P. Zhang, Industrial Control Technology: A Handbook for Engineers and Researchers, William Andrew, Inc. 2008. (Year: 2008).*
Sarwar, et al.: "Multiplier-less Artificial Neurons Exploiting Error Resiliency for Energy-Efficient Neural Computing", arxiv.org, Cornell University Library, Ithaca, NY, (2016), pp. 1-6, XP081348803.
Tang and Kwan: "Multilayer Feedforward Neural Networks with Single Powers-of-Two Weights," IEEE Transactions on Signal Processing, 41(8), (1993), pp. 2724-2727.
Wallace C. S.: "A Suggestion for a Fast Multiplier", IEEE Transactions on Electronic Computers, vol. EC-13 (1), (1964), pp. 14-17.
International Search Report for PCT/EP2020/069872 Issued Oct. 5, 2020.
Vogel, Sebastian et al. "Self-Supervised Quantization of Pre-Trained Neural Networks for Multiplierless Acceleration" 2019 Design, Automation & Test in Europe Conference & Exhibition, EDAA, Mar. 25, 2019, pp. 1094-1099. DOI: 10.23919/DATE.2019. 8714901 XP033550047. Retrieved from the Internet on Dec. 29, 2021: https://past.date-conference.com/proceedings-archive/2019/pdf/0977.pdf. 6 Pages.
Sebastian Vogel et al. "Efficient hardware acceleration of CNNs using logarithmic data representation with arbitrary og-base" Computer-Aided Design, ACM, 2 Penn Plaza, Suite 701 New York. NY 10121-0701 USA, Nov. 5, 2018, pp. 1-8 DOI: 10.1145/3240765. 3240803 ISBN: 978-1-4503-5950-4. XP058420986. Retrieved from the Internet on Dec. 29, 2021: https://ur.booksc.eu/book/73679696/cb58e3. 8 Pages.

* cited by examiner

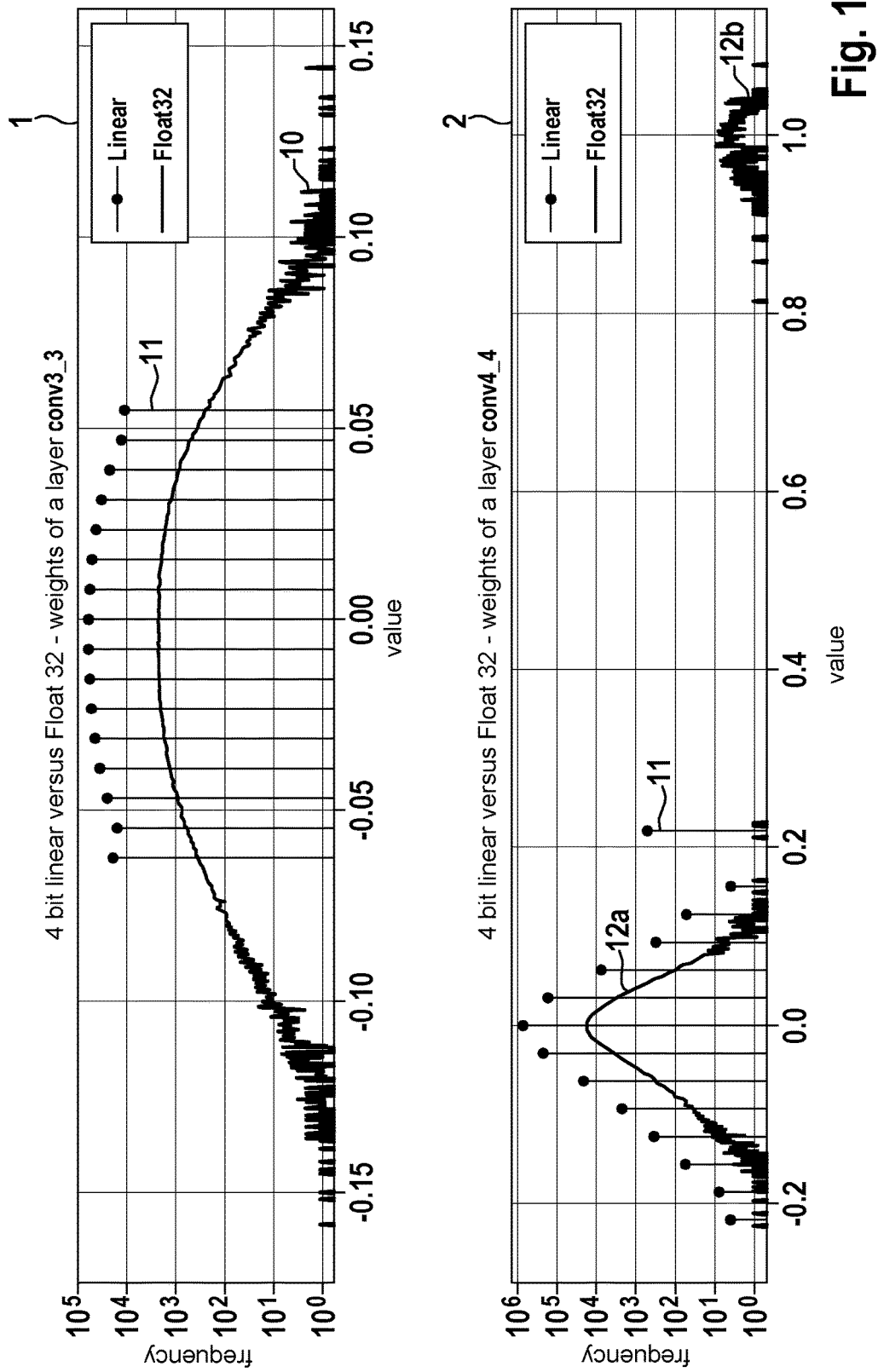

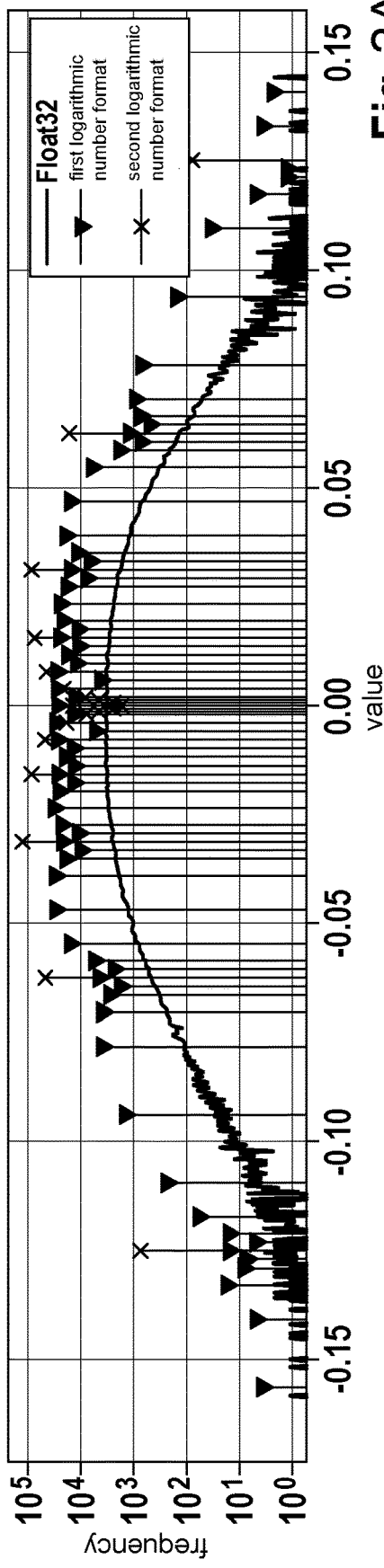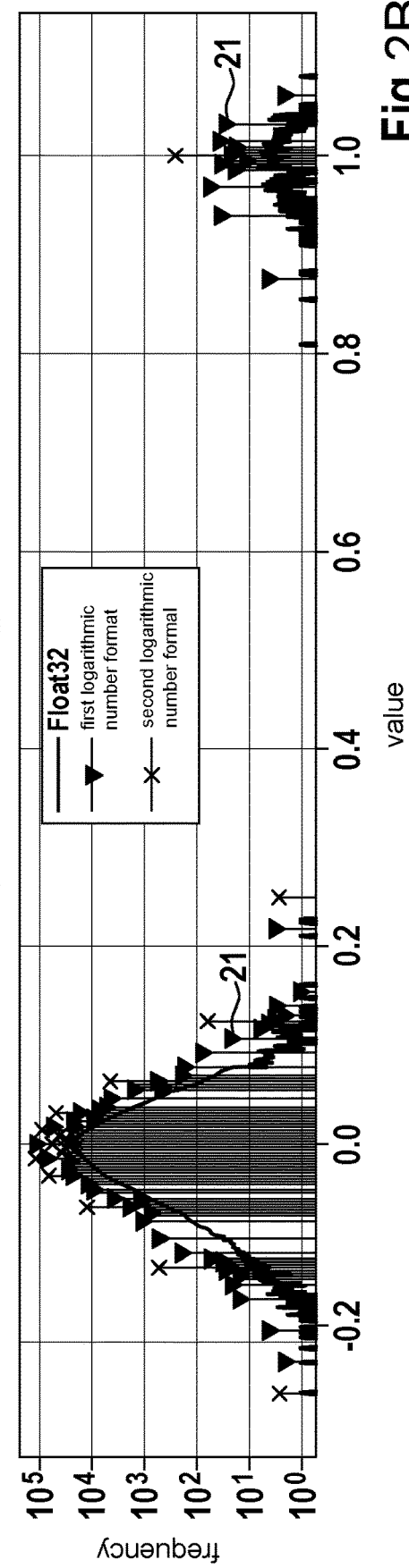

PROCESSING UNIT, METHOD AND COMPUTER PROGRAM FOR MULTIPLICATION

FIELD

The present invention relates to a processing unit for computing a multiplication with the aid of bitshift operators. The present invention also relates to a method and a computer program, which are each set up to carry out the multiplication with the aid of bitshift operators.

BACKGROUND INFORMATION

In order to be able to implement neural networks in real time, dedicated hardware accelerators have been developed. Hardware accelerators use hardware-implemented multiply-accumulate (MAC) units for multiplication. It has been recognized, that the workload in a neural network is made up almost exclusively of multiplications and additions. Consequently, hardware accelerators attain a high computational throughput, using a massive parallel deployment of MAC units. In general, networks are trained on graphical processing units (GPU's), which means that the representation format of network weights and the intermediate results corresponds to float32. This number format is less suitable for use in embedded systems, since the corresponding embedded system would have to use float32 MAC units, which occupy a lot of space and have a high power demand.

SUMMARY

In accordance with an example embodiment of the present invention, a processing unit is provided, which permits the use of a number format having a reduced word length (e.g., 4 bits), through which hardware multipliers may advantageously be dispensed with, and instead, bitshifts may be used. This is because in an ASIC implementation, bitshifts require considerably (10 to 20 times) less chip area. Therefore, they are more cost-effective. In addition, the use of bitshifts results in a reduced power demand in comparison with multiplication. Furthermore, the processing unit in accordance with an example embodiment of the present invention also provides flexibility with regard to resolving accuracy and high computational throughput. The neural network may be, in particular, a part of an image classifier. Accordingly, the processing unit may be a processing unit particularly suited for implementing the image classifier.

In addition, the processing unit may handle differently quantized weights of different layers of the neural network. This is because the processing unit may be operated differently as a function of the word lengths used.

Conventional MAC units of the accelerators mentioned above use linearly quantized weights, and therefore, they may not profit from the cost, energy, and chip-area savings of simple bitshifts to the extent that the processing unit of the present invention does.

Thus, an accelerator, which may be configured flexibly as a function of the standards for accuracy of the number format, power consumption, and computational throughput, is provided by the processing unit of the present invention.

In a first aspect of the present invention, a processing unit is provided for multiplying a first value x by a first multiplicand w, or for multiplying the first value x by a second and third multiplicand, respectively. In accordance with an example embodiment of the present invention, the processing unit receives the value x and exponents of a logarithmic number format of the multiplicands. In the logarithmic number format, the multiplicands are each represented by at least one exponent at a specifiable base. The processing unit obtains at least two exponents $\hat{w}_1$, $\hat{w}_2$ of a first logarithmic number format (for example, in the "two-hot" number format) of the first multiplicand, or, in each instance, an exponent of a second logarithmic number format (for example, in the "power-of-two" number format) of the second and third multiplicands. It may be said that the exponents are assigned to either the first multiplicand or the second and third multiplicand. The exponents, as well as the first value x, are quantized, for example, using 2, 4, or 8 bits, or more than 8 bits, and may be present in the form of a binary number.

The processing unit includes a first register, in which either the two exponents $\hat{w}_1$, $\hat{w}_2$ of the first multiplicand or the exponent of the second and the exponent of the third multiplicand are stored. A configuration bit is present, which indicates whether either the two exponents $\hat{w}_1$, $\hat{w}_2$ of the first multiplicand or the exponent of the second and the exponent of the third multiplicand are stored in the first register. It is also possible for the configuration bit to indicate whether the stored exponents of the first register are assigned to one or more than one multiplicand, or whether these exponents are used in the first or second logarithmic number format. The configuration bit may be a set bit in a register or memory of the processing unit, preferably, in the first register.

In addition, the processing unit includes a first and second bitshift operator. The bitshift operator is configured to shift a binary number to the left (preferably in hardware), as a function of a specifiable (binary) number, by the number of places of the specifiable value. The first bitshift operator shifts the first value x by a number of places, which corresponds to a value of a first exponent of the stored exponents of the first register. The second bitshift operator shifts the first value x by the number of places, which corresponds to a value of a second exponent of the exponents of the first register. The processing unit includes, in addition, an adder, which adds up the result of the first and second bitshift operator. If the configuration bit indicates that the first multiplicand is stored in the first register, the processing unit is also configured to output the result (B) of the adder, and if the configuration bit indicates that the second and third multiplicands are stored in the first register, the processing unit is configured to output the result (A) of the second bitshift operator and the result (C) of the first bitshift operator. The result (B) is available at an output of the adder, after it has executed its arithmetic operation. Result (B) corresponds to the result of multiplying the value x by the first multiplicand. Result (A) corresponds to the result of multiplying the value x by the multiplicand, which is assigned the exponent that was used for the bitshift of the second bitshift operator. The equivalent applies to result (C).

On one hand, an advantage of the processing unit is that the provided hardware has a first mode ready (e.g., "two-hot" number format), which preferably comes close to a linear quantization with regard to the resolution/number representation and may therefore calculate highly accurately, but with a low space requirement and power demand due to the bitshift operators. On the other hand, the processing unit provides a further mode (e.g., "power-of-two" number format), in which the efficiency, or more precisely, the computational throughput, is in the fore. If the overall workload remains constant, then the circuit consumes particularly little power in this mode. If the overall workload is variable, then the computational throughput is twice as high in this mode. Therefore, the processing unit not only permits energy savings, but may also be used for a higher data throughput. Another advantage of the processing unit is that the accuracy of resolution is adjustable by the two modes and consequently supports different word lengths for different layers of a neural network.

In accordance with an example embodiment of the present invention, it is provided that the processing unit include a further bitshift operator, which shifts the result of the first bitshift operator to the left by a specifiable number of places. This specifiable number corresponds to a specifiable value $\zeta$, which indicates a different resolution of the two exponents of the first multiplicand. The adder accumulates the result of the second bitshift operator and the further bitshift operator.

It is further provided that in each instance, the exponents in the first register be assigned a sign bit, and that the adder sum up or subtract the results of the bitshift operators as a function of the sign bit. The sign bit indicates whether the specific multiplicand, in particular, the exponent, which is assigned to this multiplicand, is a positive or negative number.

In addition, it is provided that the processing unit include a first and second accumulator. Then, if the configuration bit indicates that the first multiplicand is stored in the first register, one of the accumulators accumulates only the result (B) of the adder. If the configuration bit then indicates that the exponents of the second and third multiplicands are stored in the first register, the first accumulator accumulates the result (A) of the second bitshift operator, and the second accumulator accumulates the result (C) of the first bitshift operator.

Accumulate may be understood to mean that a plurality of multiplications are carried out and the results of the individual multiplications are summed up, e.g., $\alpha \leftarrow \alpha+(w*x)$.

The accumulators may each include two registers and an accumulation register and an adder. One of the results A, B or C is stored in a first register. Stored in the second register, is the sign bit of the specific exponent, which is assigned to the corresponding multiplicand that is used for ascertaining the result from the first register. The adder adds or subtracts the contents of the first register to or from the accumulation register as a function of the sign bit from the second register, and stores the result in the accumulation register. In this connection, it is advantageous that this allows vector-matrix multiplication to be carried out in a highly efficient manner.

In addition, it is provided that the first accumulator sum up or subtract the result (A) as a function of the sign bit, which is assigned to the exponent that is used for the second bitshift operator; and that the second accumulator sum up or subtract the result (C) as a function of the sign bit, which is assigned to the exponent that is used for the first bitshift operator. The sign bits are preferably stored in the first register, as well.

Furthermore, it is provided that the processing unit be configured to reset the first and second accumulators, if the configuration bit is changed. Reset may be understood to mean that a stored value, that is, contents, of the accumulator (register) is set to a specifiable initial value, preferably, to the value zero.

In addition, it is provided that the base of the multiplicands of the first and second logarithmic number format correspond to the value two. The total word length of the two exponents of the first multiplicand may correspond to the total word length of the two exponents of the first and second multiplicand, or the other way around.

In a second aspect of the present invention, a, in particular, computer-implemented, method is provided for operating the processing unit according to the first aspect. The method includes the steps: providing two exponents and a value x and a configuration bit; the configuration bit indicating whether the exponents are assigned to exactly one multiplicand or are each assigned to a multiplicand. That is followed by the execution of a first bitshift of the value x by a number of places of the first exponent, and a second bitshift of the value x by the number of places of the second exponent. After that, the result of the bitshift operators is outputted as a function of the configuration bit; if the configuration bit indicates that the two exponents are assigned to one multiplicand, the results of the bitshift operators being added and outputted as the result of the multiplication; if the configuration bit indicates that the two exponents are each assigned to a multiplicand, the results of the bitshift operators being outputted, in each instance, as a result of the multiplication of the value by, in each instance, one of the multiplicands.

In one further aspect of the present invention, a computer program is provided. The computer program is designed to carry out the method of the second aspect. The computer program includes instructions, which cause a computer to execute one of these above-mentioned methods, using all of its steps, if the computer program runs on the computer. A machine-readable storage module, in which the computer program is stored, is additionally provided.

Exemplary embodiments of the aspects of the present invention are represented in the figures and explained in greater detail in the following description.

BRIEF DESCRIPTION OF THE DRAWINGS

FIG. 1 shows two schematic graphs, which represent a distribution of linearly quantized and un-quantized values of filters of a layer of a neural network.

FIGS. 2A and 2B show two schematic graphs, which represent a distribution of values of the filters of the layer of the neural network, which are quantized and un-quantized in logarithmically different manners.

DETAILED DESCRIPTION OF EXAMPLE EMBODIMENTS

Figure 3:
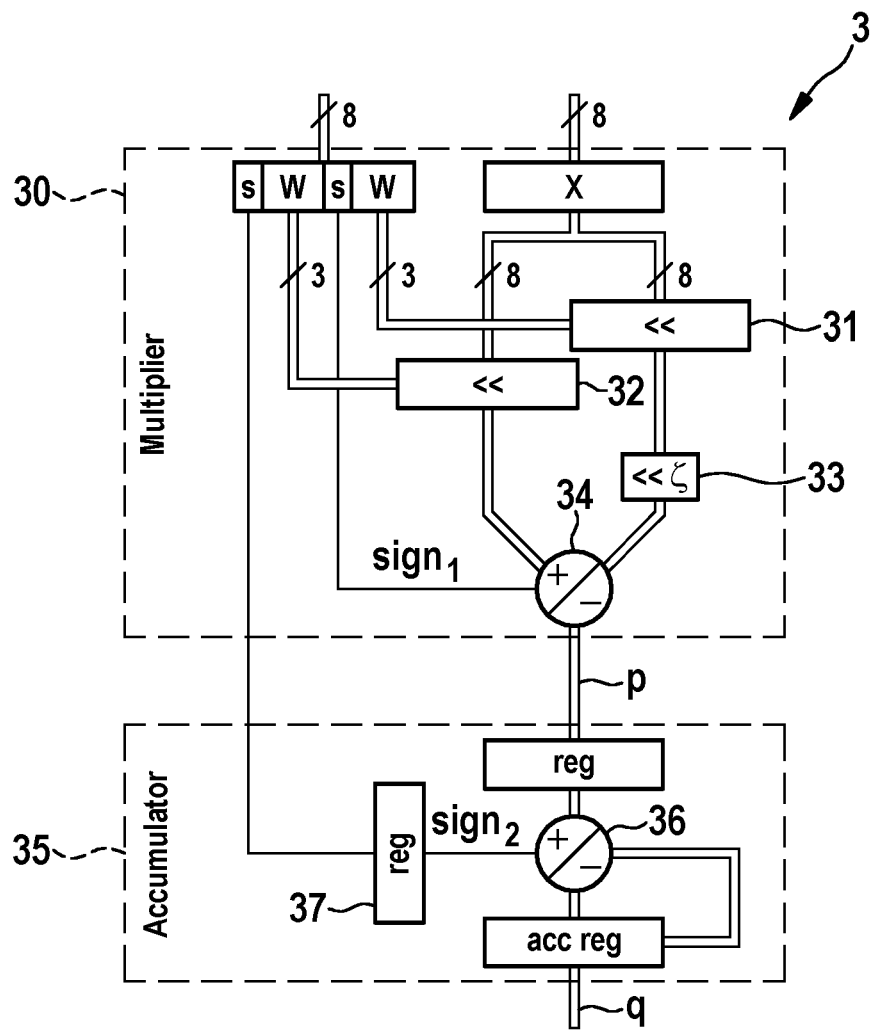
FIG. 3 shows a schematic representation of a multiplier.

FIG. 1 shows a first schematic graph 1, which shows a distribution 10 of values of a filter (conv3_3), in particular, weights, of a layer of a trained neural network. Distribution 10 is a frequency distribution of quantized values in a float32 number representation. It is noted that in first schematic graph 1, the values follow a monomodal distribution. In addition, quantized values 11 having a resolution of 4 bits are shown in first schematic graph 1. In this connection, these quantized values 11 having a resolution of 4 bits are quantized linearly and are situated about the value 0.

However, it was observed that the values of the filters, in particular, the weights of the neural network, follow a non-uniform frequency distribution (see second schematic graph 2). Thus, for small bit widths, linear quantization is not suitable for quantizing the values of the filters in the best possible manner in the case of a nonuniform distribution. This is because, as shown in second schematic graph 2, only a first mode 12a may be meaningfully quantized by linear quantization in the case of small bit widths, whereas along a second mode 12*b*, values of the filters are not taken into account at all in the case of linear quantization. This may result in a high quantization error.

In the following, it is provided that the distributions 10, 12*a*, 12*b*, which the values of the layers of the neural network follow, be handled with the aid of a nonuniformly distributed quantization format. A logarithmic number representation is preferably used for quantization. A logarithmic number representation is understood to mean that instead of the value of a number, only a value of an exponent at a specified base is used. For example, in the logarithmic number representation, the value 64 is represented as $2^6=64$ and is therefore stored as the value 6.

In the following, the number representation at base 2 is preferably used and is referred to as the power-of-two number format.

If weights w, that is, weights of the filter of a neural network, are quantized as a power-of-two value $2^{\hat{w}}$, the multiplication of activations x of the specific layer, that is, neurons of this layer, by the weights may be accomplished by a bitshift of the activations x by $\hat{w}$ places to the left:

$$x*w = x*2^{\hat{w}} = x << \hat{w} \tag{1}$$

In the following, the exponents are represented by a $\hat{w}$. It is noted that the value x and the exponent $\hat{w}$ are each quantized and are preferably present in the form of a binary number.

It was recognized that the logarithmic representation of weights of a neural network is only suitable to a limited extent, since, in particular, for the case of a bimodal distribution, only a few sampling points are available for the second mode (cf. second schematic graph 2), see FIG. 2B.

Therefore, it is provided that a number format or a quantization be used, where the weights w of a neural network are represented by two power-of-two values:

$$w = w_1 + w_2 = 2^{\hat{w}_1} + 2^{\hat{w}_2} \tag{2}$$

In the following, the number format resulting from the two power-of-two values in accordance with equation (2) shall be referred to as the two-hot number format.

In the two-hot number format, the following is yielded for multiplication:

$$x*w = x*(w_1+w_2) = x << \widehat{w_1} + x << \widehat{w_2} \tag{3}$$

For the first and second schematic graphs 1, 2, the corresponding quantization values from the power-of-two and the two-hot number formats are shown illustratively in FIGS. 2A and 2B.

In FIGS. 2A and 2B, it is apparent that the two-hot format for bimodal distributions provides more useful sampling values 21 for the second mode.

In order to integrate, in the two-hot number representation, a degree of freedom, which does not generate extra outlay or considerable additional costs, the parameter $\zeta$ may be inserted. Parameter $\zeta$ indicates a different resolution of the two values $w_1$ and $w_2$:

$$w*(2^\zeta*w_1+w_2) = (x << \widehat{w_1}) << \zeta + x << \widehat{w_2} \tag{4}$$

FIG. 3 schematically shows a processing unit 3 for multiplying at least two numbers in the two-hot number format.

In this specific embodiment, processing unit 3 includes a multiplier 30 and, optionally, an accumulator 35.

Multiplier 30 receives the value x, that is, activation x, and the weight in two-hot number format, that is, the exponents of weight $\hat{w}_1$ and $\hat{w}_2$, as input values. In addition, exponents $\hat{w}_1$ and $\hat{w}_2$ are assigned sign bits $s_1$, $s_2$, respectively. Exponents $\hat{w}_1$ and $\hat{w}_2$ and, preferably, the sign bits, are stored in a first register.

The input values preferably have a resolution of 8 bits. Any other resolutions, preferably, resolutions of 16 bits or less than 4 bits, are possible.

Then, using bitshift operators 31, 32, multiplier 30 calculates the result of the multiplication as a function of exponents $\hat{w}_1$ and $\hat{w}_2$, and as a function of activation x, in accordance with equation 4. For the case in which parameter $\zeta$ is given, then, as in equation 4, the result of bitshift operator 31 may be shifted to the left by a further bitshift operator 33, by the number of places that are described by parameter $\zeta$.

The result of the two bitshift operators 31, 32 is then preferably summed up or subtracted by an adder 34, as a function of sign bit $s_1$ of first exponent $\hat{w}_1$, and outputted as intermediate result p.

For the case in which activation x is intended to be multiplied a plurality of times by different weights w and subsequently summed over all of the results of the individual multiplication, accumulator 35 may be used. As soon as multiplier 30 ascertains intermediate result p, this may be processed further by accumulator 35. In this connection, accumulator 35 ascertains a final result q as a function of intermediate result p and sign bit $s_2$ of exponent $\hat{w}_2$, and as a function of the stored result of accumulator register (acc_reg).

Accumulator 35 preferably stores intermediate result p in a register (reg). After that, sign bit (sign_2) is read out of a further register (37), and intermediate result p of register (reg) and the contents of accumulator register (acc_reg) are added up or subtracted by an adder 36 as a function of sign bit (sign_2). The result of adder 36 is then stored in accumulator register (acc_reg) and optionally outputted as result q.

Figure 4:
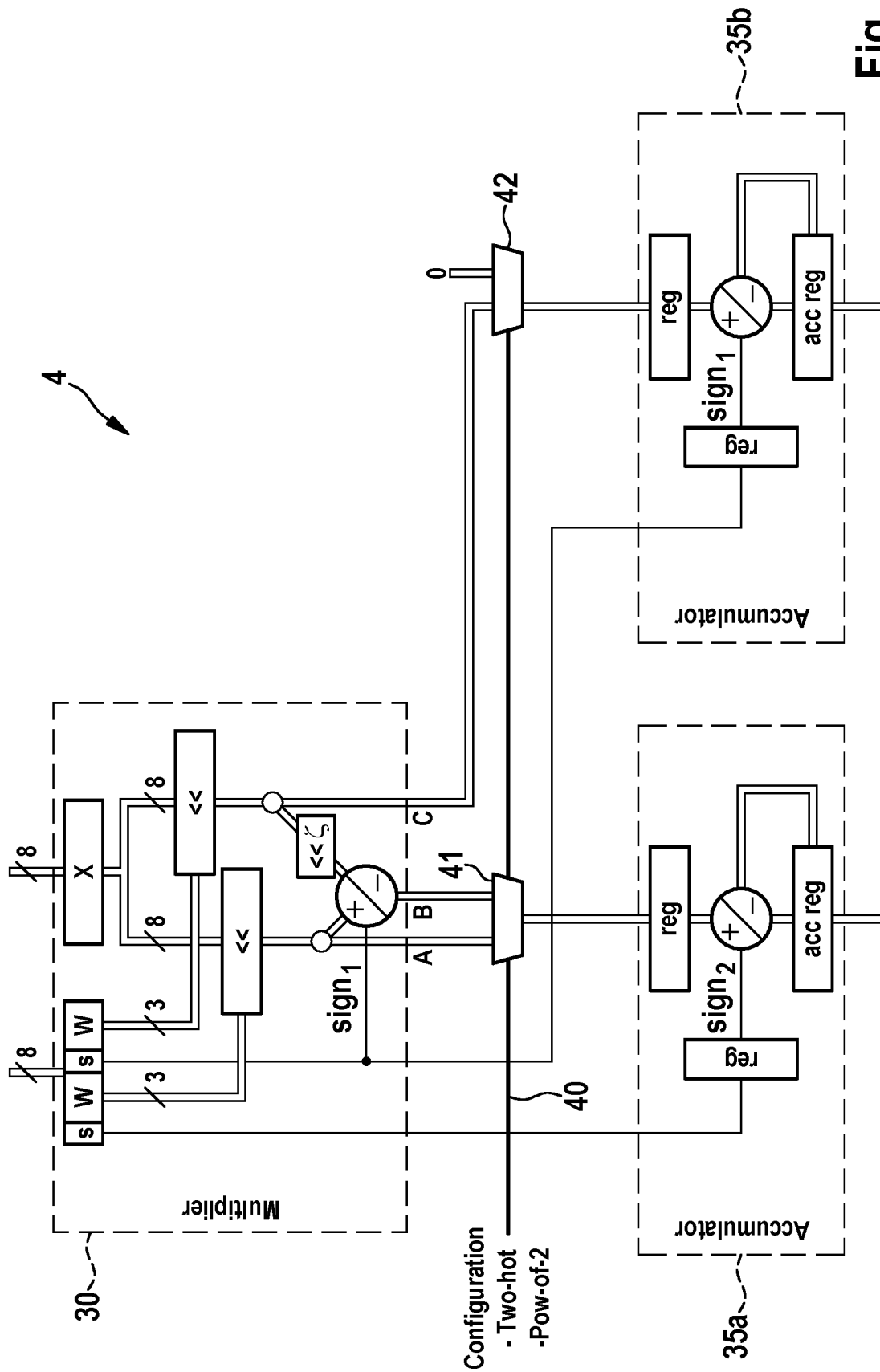
FIG. 4 shows a schematic representation of a further multiplier.

FIG. 4 shows a schematic representation of a further processing unit 4, which may advantageously carry out multiplications in both the two-hot number format and the power-of-two number format.

Using a configuration bit 40, processing unit 4 may either be shifted into a first mode, that is, weights w according to the two-hot number format, or configured, in a second mode, to process two weights in the power-of-two number format.

In this context, in the two-hot mode (first mode), the result of the two bitshifts is added (or subtracted, as a function of a first sign bit (sign_1)). The multiplication result is available at output B and is accumulated in a first accumulator 35*a* as a function of a second sign bit (sign_2). The output of a second accumulator 35*b* is 0 and/or is not used. In this mode, the resolution of the number representation for weights is greater than in the second mode.

The results of muliplier 30 (at output A, B, C) are passed on via switches 41, 42. These switches transmit the results of multiplier 30 (at output A, B, C) to the respective accumulators 35*a*, 35*b* as a function of configuration bit 40.

The switches may each be multiplexers.

For the first mode, configuration bit 40 may alternatively deactivate second accumulator 35*b* or disregard the results at outputs A and C.

In the power-of-two mode (second mode), two different weights are multiplied parallelly by input value x, using two bitshifts. The two multiplication results are available at outputs A and C.

Each result is added onto or subtracted from the accumulator register of first and second accumulator 35*a*, 35*b* as a function of corresponding sign bit (sign_1, sign_2). Two results are subsequently available at the two accumulator outputs. In this mode, the number format resolves the weights in a more rough manner. In exchange, processing unit 4 attains double the computational throughput.

In the power-of-two mode (second mode), the results of the first and second accumulator 35a, 35b are preferably added up with the aid of a further adder, which is not shown in FIG. 4. This is preferably carried out, when all results have been calculated in the accumulators and a sum over all of the multiplication results is intended to be outputted.

Figure 5:
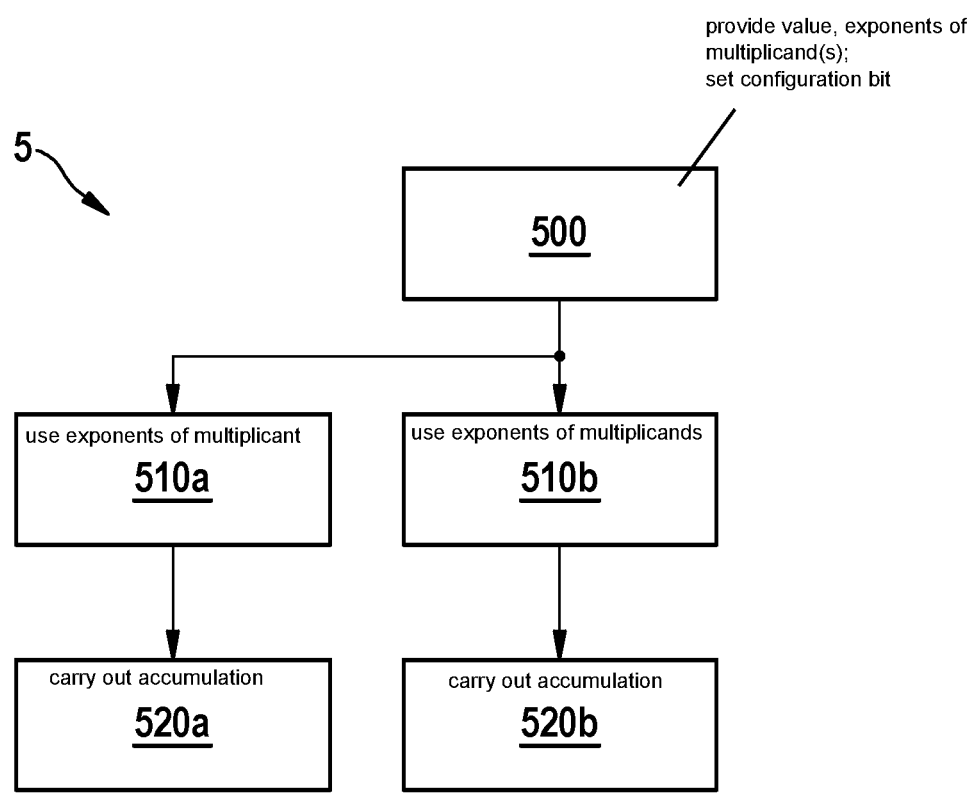
FIG. 5 shows a specific embodiment of a method for multiplying values quantized in logarithmically different manners.

FIG. 5 schematically shows a flow chart 5 for operating processing unit 4, in particular, for multiplying a value x by a multiplicand in the two-hot number format, or for multiplying a value x by 2 multiplicands in the power-of-two number format.

In first step 500, the value x, the exponents of the multiplicand in the two-hot number format, or the exponents of the two multiplicands in the power-of-two number format are provided. In addition, a configuration bit may be set, which indicates whether the two exponents are assigned to the one multiplicand in the two-hot number format, or to the two multiplicands in the power-of-two number format.

In step 500, either as a function of the configuration bit or as a function of the number format, in which the multiplicands are present, it is then decided whether the multiplication is carried out in accordance with the first mode or the second mode.

If it is decided that the multiplication will be carried out according to the first mode, then step 510a is executed after step 500. In step 500, if it is decided that the multiplication should be carried out in accordance with the second mode, then step 510b follows.

In step 510a, the exponents of the one multiplicand are used in the two-hot format in accordance with equation (3): The result of the multiplication is ascertained with the aid of bitshift operators and addition.

After step 510a is finished, step 520a follows. In this case, the result of step 510a is outputted. In addition, or as an alternative, in step 520a, accumulation may be carried out over the results of step 510a.

In step 510b, the exponents of the two multiplicands in the power-of-two number format are used, in order to shift the value x to the left, in each instance, by the number of places of the exponents, using shifting operations, for example, with the aid of two bitshift operators: $x \ll \hat{w}_1$ and $x \ll \hat{w}_2$.

After step 510b is finished, step 520b follows. In this connection, the results of the specific shifting operations of step 510b are outputted separately from each other. In addition, or as an alternative, in step 520b, accumulation may be carried out separately, in each instance, over the two results of step 510b.

What is claimed is:

1. A processing unit configured to multiply a first value by at least one multiplicand, the processing unit comprising:
   a first register, in which may be stored either: (i) two exponents of a first logarithmic number format of a first multiplicand, or (ii) an exponent of a second logarithmic number format of each of a second multiplicand and third a multiplicand, the processing unit being configured to set a configuration bit which indicates whether either: (i) the two exponents of the first multiplicand or (ii) the exponent of the second and the exponent of the third multiplicand, are stored in the first register;
   a first bitshift operator and a second bitshift operator, the first bitshift operator being configured to shift the first value by a number of places, which corresponds to a value of a first exponent of the stored exponents of the first register, and the second bitshift operator being configured to shift the first value by a second number of places, which corresponds to a value of a second exponent of the stored exponents of the first register;
   an adder configured to add up a result of the first bitshift operator and a result of the second bitshift operator;
   wherein the processing unit is configured to output a result of the adder if the configuration bit indicates that the two exponents of the first multiplicand is stored in the first register; and
   wherein the processing unit is configured to output the result of the second bitshift operator and the result of the first bitshift operator if the configuration bit indicates that the exponents of the second and third multiplicands are stored in the first register.

2. The processing unit as recited in claim 1, wherein the processing unit includes a further bitshift operator, the further bitshift operator beings configured to shift the result of the first bitshift operator to the left by a third number of places, the processing unit is configured to receive a specifiable value, the third number corresponds to a specifiable value, which indicates a different resolution of the two exponents of the first multiplicand, and the adder is configured to add up the result of the second bitshift operator and a result of the further bitshift operator.

3. The processing unit as recited in claim 1, wherein sign bits, which are each assigned to one of the stored exponents, may additionally be stored in the first register; and the adder is configured to sum up or subtract the results of the first and second bitshift operators as a function of at least one of the sign bits.

4. The processing unit as recited in claim 3, wherein the processing unit further includes a first accumulator and a second accumulator, and wherein the processing unit is further configured in such a manner that if the configuration bit indicates that the first multiplicand is stored in the first register, one of the accumulators accumulates only a result of the adder, and the processing unit is further configured in such a manner that if the configuration bit then indicates that the exponents of the second and third multiplicands are stored in the first register, the first accumulator accumulates the result of the second bitshift operator, and the second accumulator accumulates the result of the first bitshift operator.

5. The processing unit as recited in claim 4, wherein the first accumulator is configured to sum up or subtract the result of the second bitshift operator as a function of the sign bit which is assigned to the exponent that is used for the second bitshift operator, and the second accumulator is configured to sum up or subtract the result of the first bitshift operator as a function of the sign bit, which is assigned to the exponent that is used for the first bitshift operator.

6. The processing unit as recited in claim 4, wherein the processing unit is further configured to reset the first and second accumulators, if the configuration bit is changed.

7. A method for operating a processing unit configured to multiply a first value by at least one multiplicand, the method comprising the following steps:
   providing two exponents, a value, and a configuration bit, the configuration bit indicating whether the two exponents are assigned to exactly one multiplicand or are each assigned to a different multiplicand;
   executing a first bitshift of the value by a first number of places which corresponds to a value of a first exponent of the two exponents, and a second bitshift of the value by a second number of places which corresponds to a value of a second exponent of the two exponents; and outputting results of the first and second bitshifts as a function of the configuration bit, wherein when the configuration bit indicates that the two exponents are assigned to exactly one multiplicand, the results of the first and second bitshifts being added and outputted as a result of the multiplication, and when the configuration bit indicates that the two exponents are each assigned to a different multiplicand, the results of the first and second bitshifts each being outputted as a result of the multiplication of the value by, in each instance, one of the multiplicands.

8. The method as recited in claim 7, wherein a base of the multiplicands of the first and second logarithmic number formats corresponds to the value 2.

9. A non-transitory machine-readable storage element on which is stored a computer program for operating a processing unit configured to multiply a first value by at least one multiplicand, the computer program, when executed by a computer, causing the following steps to be carried out:

providing two exponents, a value, and a configuration bit, the configuration bit indicating whether the two exponents are assigned to exactly one multiplicand or are each assigned to a different multiplicand;

executing a first bitshift of the value by a first number of places which corresponds to a value of a first exponent of the two exponents, and a second bitshift of the value by a second number of places which corresponds to a value of a second exponent of the two exponents; and outputting results of the first and second bitshifts as a function of the configuration bit, wherein when the configuration bit indicates that the two exponents are assigned to exactly one multiplicand, the results of the first and second bitshifts being added and outputted as a result of the multiplication, and when the configuration bit indicates that the two exponents are each assigned to a different multiplicand, the results of the first and second bitshifts each being outputted as a result of the multiplication of the value by, in each instance, one of the multiplicands.

* * * * *